United States Patent [19]
Oberoi

[11] Patent Number: 4,712,361
[45] Date of Patent: Dec. 15, 1987

[54] COLLATION ASSEMBLIES

[75] Inventor: Bhushan K. Oberoi, Horley, United Kingdom

[73] Assignee: Redland Roof Tiles Limited, Surrey, England

[21] Appl. No.: 751,911

[22] Filed: Jul. 5, 1985

[30] Foreign Application Priority Data

Jul. 6, 1984 [GB] United Kingdom ................. 8417249

[51] Int. Cl.$^4$ ..................... B65G 57/14; B65G 49/05
[52] U.S. Cl. ........................................ 53/540; 53/582;
198/448; 198/627; 414/36; 414/43; 414/79;
414/782
[58] Field of Search ................. 198/627, 448; 414/43,
414/46, 76, 78, 783, 79, 222, 36, 100, 754, 782;
53/540, 582

[56] References Cited

U.S. PATENT DOCUMENTS

| 2,236,103 | 3/1941 | Lohner et al. | 414/782 X |
|---|---|---|---|
| 3,917,049 | 11/1975 | Shirai et al. | 198/448 |
| 4,009,789 | 3/1977 | Runyan et al. | 414/783 X |
| 4,085,566 | 4/1978 | Crowe et al. | 414/46 X |
| 4,303,365 | 12/1981 | Evverard et al. | 414/78 X |
| 4,398,455 | 8/1983 | Merwarth | 414/78 X |
| 4,566,834 | 1/1986 | Baba et al. | 198/627 X |

FOREIGN PATENT DOCUMENTS

| 2454703 | 5/1976 | Fed. Rep. of Germany . |
|---|---|---|
| 2646932 | 4/1978 | Fed. Rep. of Germany . |
| 3009089 | 9/1980 | Fed. Rep. of Germany . |
| 3031661 | 3/1982 | Fed. Rep. of Germany . |
| 3030617 | 4/1982 | Fed. Rep. of Germany . |
| 3101569 | 8/1982 | Fed. Rep. of Germany . |
| 120851 | 7/1976 | German Democratic Rep. . |
| 1192693 | 5/1970 | United Kingdom ................. 198/627 |

Primary Examiner—Frank E. Werner
Assistant Examiner—Janice Krizek
Attorney, Agent, or Firm—Beveridge, DeGrandi and Weilacher

[57] ABSTRACT

Apparatus for collating and stacking building components, for example tiles, has pairs of conveyors with shelves for supporting edges of tiles. The tiles are fed to the shelves by a conveyor and the pairs of conveyors move upwardly in timed relation to locate tiles on the shelves. When all the shelves are full, the pairs of conveyors move downwards and apart to deposit the tiles in a stack on to a support. The timing of this avoids shock loads on the tiles. The stack of components is then banded and removed from the apparatus.

18 Claims, 16 Drawing Figures

COLLATION ASSEMBLIES

This invention is concerned with improvements in or relating to collation assemblies, that is apparatus for the collation and stacking of manufactured building components. The invention is particularly, although not exclusively, concerned with improvements in collation assemblies intended for use with tile plant.

By "tile plant" it is meant concrete roof tile manufacturing plant. It is well known that concrete roof tiles are generally produced by:
(a) feeding a series of metal pallets in end to end relationship through a tile making machine where concrete mortar is formed into a continuous ribbon on the upper surfaces of the pallets;
(b) severing the ribbon of mortar into discrete tile lengths on said pallets;
(c) passing the green-state tiles thus formed on the pallets, via a crowding conveyor and a racking assembly, to racks;
(d) transferring racks of "green state" tiles to a curing chamber concomitantly with the transfer of racks of cured tiles to a de-racking assembly;
(e) de-racking the cured tiles and feeding them to a depalleting device where the tiles are separated from their pallets;
(f) feeding the pallets in a return loop of a main conveyor to the tile making machine of the plant; and,
(g) feeding the cured tiles to a collation assembly and then to a packaging apparatus.

In their passage to and through the collation assembly the tiles may be subjected to shock loads due to the sudden stop-start conditions under which known collation assembly have operated. In such circumstances the roof tiles may suffer damage which, if it is obvious from visual inspection, will enable the tiles to be removed before packaging is effected.

However, it is often the case that damage to cured tiles only becomes evident after packaging and transportation to an end user. In such instances hairline cracks caused by the shock loads result in corners breaking off tiles as they are handled or following a spell of inclement weather. This leads to a loss of goodwill between the end-user and the manufacturer.

It is, thus, one of the objects of the present invention to provide an improved collation assembly suitable for use in a tile plant wherein the shock loading of tiles fed to and through the collation assembly is reduced to an acceptable minimum.

The invention provides apparatus for collating and stacking manufactured building components, comprising a plurality of pairs of shelf means, each shelf means being movable up and down and pairs of shelf means being movable towards and away from each other, conveyor means for feeding the components to the shelf means, means for moving the shelf means up or down in timed relation to the movement of the conveyor thereby to locate the components on the shelf means, opposed edges of each component being supported by a pair of shelf means, a support for a stack of components and means for moving pairs of shelf means apart in timed relation to downward or upward movement of the shelf means thereby to release the components and stack them on the support, the relative timing of the movements being such that the stacking of the components is effected without undue impact shocks to the components.

Preferably the shelf means move up to locate the components on the shelf means and downward to release the components.

Preferably fixed means are provided adjacent to the shelf means, the fixed means serving to restrict sideways movement of the components after the shelf means have moved apart.

The apparatus may further comprise pusher means movable in a direction parallel to the shelf means and between pairs of shelf means to push the components into alignment.

There may be a fixed abutment aligned with the pusher means and located adjacent to ends of the shelf means remote from the pusher means, the abutment and pusher means together serving to restrict longitudinal movement of the components.

Preferably one shelf means of each pair is carried by a first chain means and the second shelf of each pair is carried by a second chain means, said shelves being parallel and spaced apart on their respective chain means and said first and second chain means being simultaneously drivable to move the shelf means up and down.

Cam means may be provided for engaging said first and second chain means to effect said towards and away movement of said pairs of shelf means.

Preferably said cam means are carried by respective third and fourth chain means, said third and fourth chain means being driven simultaneously and in timed relation to said first and second chain means.

In one embodiment, said component support is located on a carriage, said carriage being movable between a first position in which the support is aligned with the shelf means for receiving a stack of components and a second position in which clamping means is engageable with the stack of components to remove the stack from the support.

A preferred embodiment of a collation assembly according to the invention will now be described, by way of example, with reference to the accompanying drawings, in which.

Figure 1:
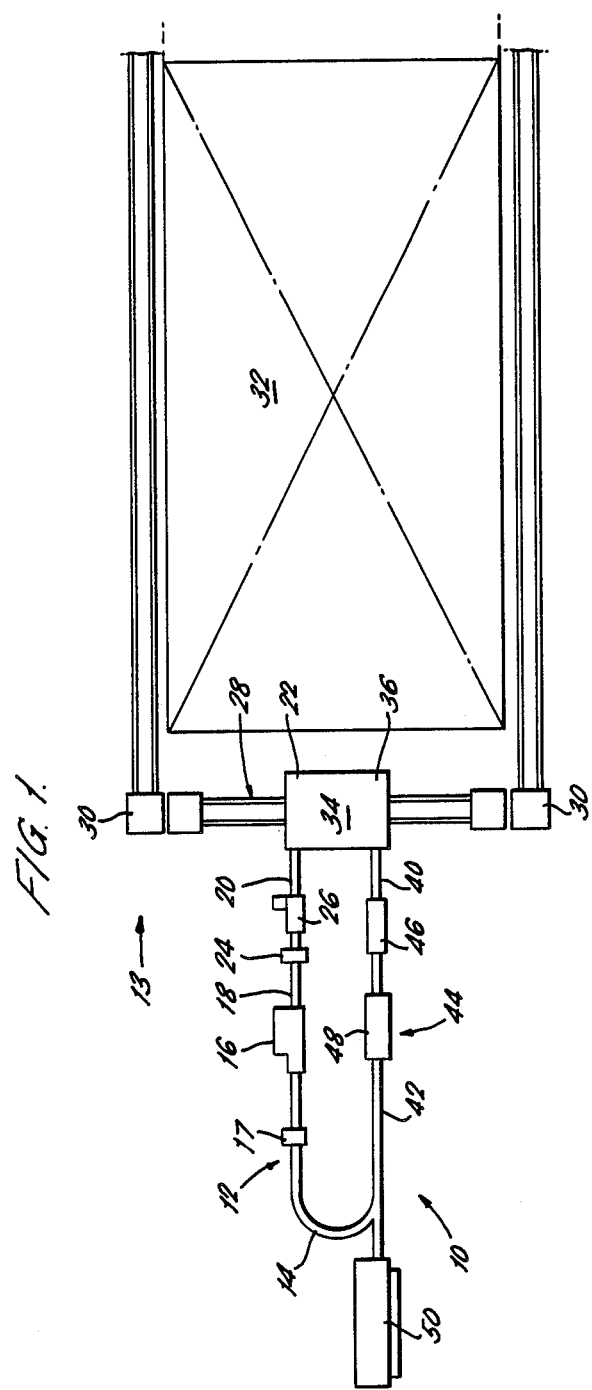
FIG. 1 is a schematic block diagram illustrating the principal sections of a concrete roof tile manufacturing plant.

Referring first to FIG. 1, a tile plant for the manufacture of concrete roofing tiles comprises a conveyor assembly 10 interconnecting the working stations of the plant. A first conveyor run 12 feeds tile pallets (not shown) in the direction of the arrow 13 from a pallet transfer device 14 to a tile making machine 16 of conventional design; between the device 14 and machine 16 the pallets pass through an oil box 17 where the upper surfaces of the tile pallets were sprayed with a release coat in known manner.

The machine 16 includes an associated pallet feed arrangement (not shown) which may be of the type described in British Patent No. 1274884 whereby the pallets are fed seriatim through a mortar box and cutting station. The mortar box is provided with a compacting roller and extrusion slipper of conventional design for compacting a ribbon of tile mortar onto the upper surfaces of the pallets, and the cutting station is provided with cutting means, which may be of the type described in British Patent No. 1352627, for cutting the ribbon of mortar into discrete tile lengths on the pallets.

On a downstream side of the machine 16, the conveyor assembly comprises an out-feed conveyor 18 for feeding the pallets and "green state" tiles carried thereby in a preset spaced relationship to an infeed conveyor 20 of a racking assembly 22. The outfeed conveyor 18 has located therealong a slurry applicator 24 and a granule applicator 26 of conventional design which may be utilised to coat the green state tiles with a slurry coating and/or a dressing of granules.

The racking assembly 22 straddles a path 28 along which tile racks 30 are moved, the tile racks following a circuitous path from the racking assembly which takes them through a curing chamber 32 in known manner.

The racking assembly 22 is part of a combined racking-de-racking apparatus 34 which also comprises a deracking assembly 36 which like the assembly 22 straddles the path 28 of the tile rack 30. The tile racks return to the de-racking assembly after passing through the curing chamber. When the assembly 36 is in use pallets and the cured tiles T are removed from the racks 30 by an outfeed conveyor 40 and returned to a cord conveyor 42 providing a second run 44 of the conveyor assembly 10.

Located along the second run 44 of the conveyor assembly 10, see FIG. 1, it a tile brushing station 46 where loose granules are removed from the upper surfaces of the cured tiles. Downstream of the station 46 is a de-palleting device 48 which is effective to separate the cured tiles from their respective pallets and to feed the tiles along the conveyor run 44 to a tile collation and a packaging apparatus 50. The pallets are fed by a lower conveyor (not shown) of the second run 44 to suitable means 14 for returning the pallets to conveyor 12, the pallets thereby starting a succeeding passage through the time making circuit.

The details of the tile making plant described in outline above air disclosed in the Specifications filed with our U.S. patent application Ser. Nos. 751,984 and 751,983, now U.S. Pat. Nos. 4,661,054 and 4,668,151, respectively, entitled "Improvements in racking assemblies" and "Improvements in de-racking assemblies".

The Collation and Packaging Apparatus

The collation and packaging apparatus 50 which is the subject of this application will now be described in detail with reference to FIG. 2 et seq., Referring first to FIG. 2, the collation and packaging apparatus 50 comprises; (i) a stripper conveyor 60 arranged to operate, when the apparatus 50 is in use, to convey cured roofing tiles T seriatim from an infeed conveyor 62 to stripping localities at upstream and downstream ends 64 and 66 respectively of the conveyor 60;

(ii) a first collation assembly 68 located at the upstream end 64 of the conveyor 60 and arranged, when the apparatus 50 is in use, to form successive stacks of said tiles T;

(iii) a second collation assembly 70 located at the downstream end 66 of the conveyor 60 and arranged, when the apparatus 50 is in use, to form successive stacks of said tiles T;

(iv) a stack positioning means 72 arranged, when the apparatus 50 is in use, to remove stacks of tiles T collated as aforesaid from the assemblies 68 and 70;

(v) stack banding means 74 and 76 arranged, when the apparatus is in use, to band thes tacks of tiles T removed from the assemblies 68 and 70;

(vi) an orienting device 78 arranged when the apparatus is in use, to remove vertical stacks of strapped tiles T from the stack positioning means 72 and to transfer them into a horizontal position adjacent the conveyor 60; and, (vii) an outfeed conveyor 79 arranged, when the apparatus is in use, to receive the stacks of banded tiles transferred as aforesaid.

The Stripper Conveyor

Figure 2:
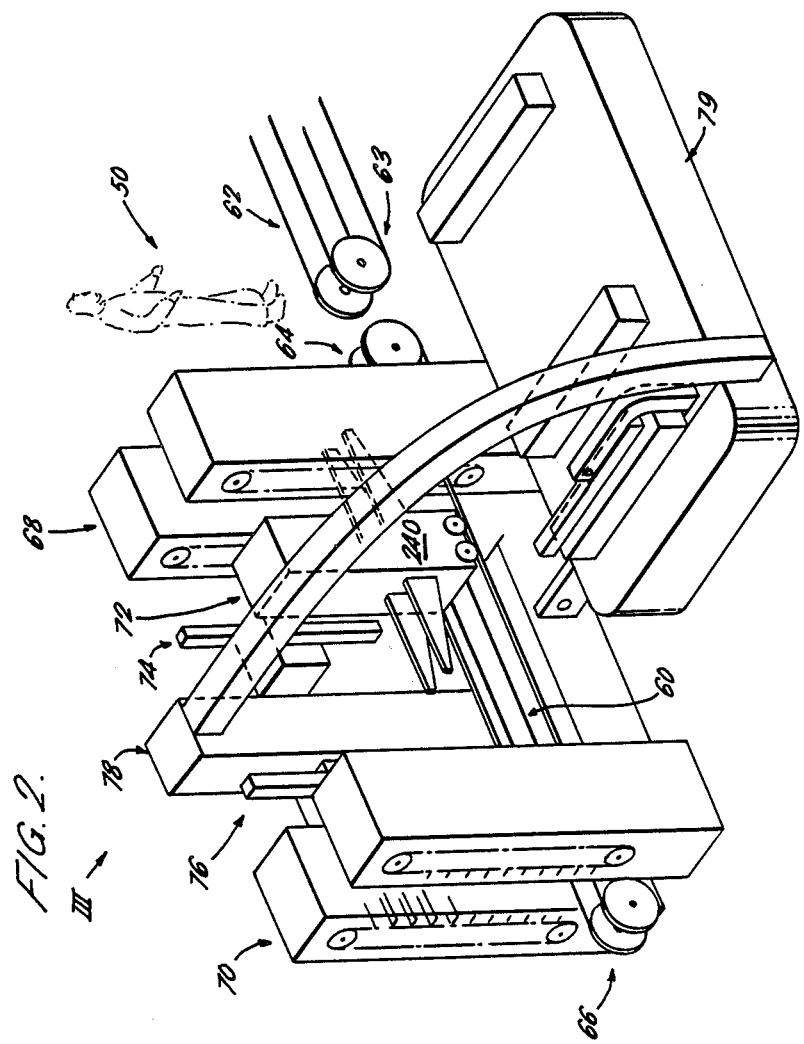
FIG. 2 is a schematic perspective view of a collation assembly and packaging apparatus, according to the invention, for use with the tile plant of FIG. 1.

The conveyors 60 and 62, which are only shown in diagrammatic representation in FIG. 2, are conventional cord conveyors.

Each conveyor 60 and 62 comprises a pair of cords 80 arranged to support concrete roofing tiles T as shown diagrammatically in FIGS. 12 to 16.

Between a downstream end 63 of the infeed conveyor 62 and an upstream end 64 of the conveyor 60 there is provided a transfer conveyor, not shown, of conventional design for supporting the said tiles and transferring them between the conveyors 62 and 60.

When the apparatus 50 is in use the conveyor 60 conveys roofing tiles T to the stripping localities as aforesaid whereat the tiles are removed from the conveyor 60 as hereinafter described.

The Collation Assemblies

The first and second collation assemblies 68 and 70 are essentially mirror images one of the other and, therefore, only the assembly 68 will be described in detail.

Figure 8:
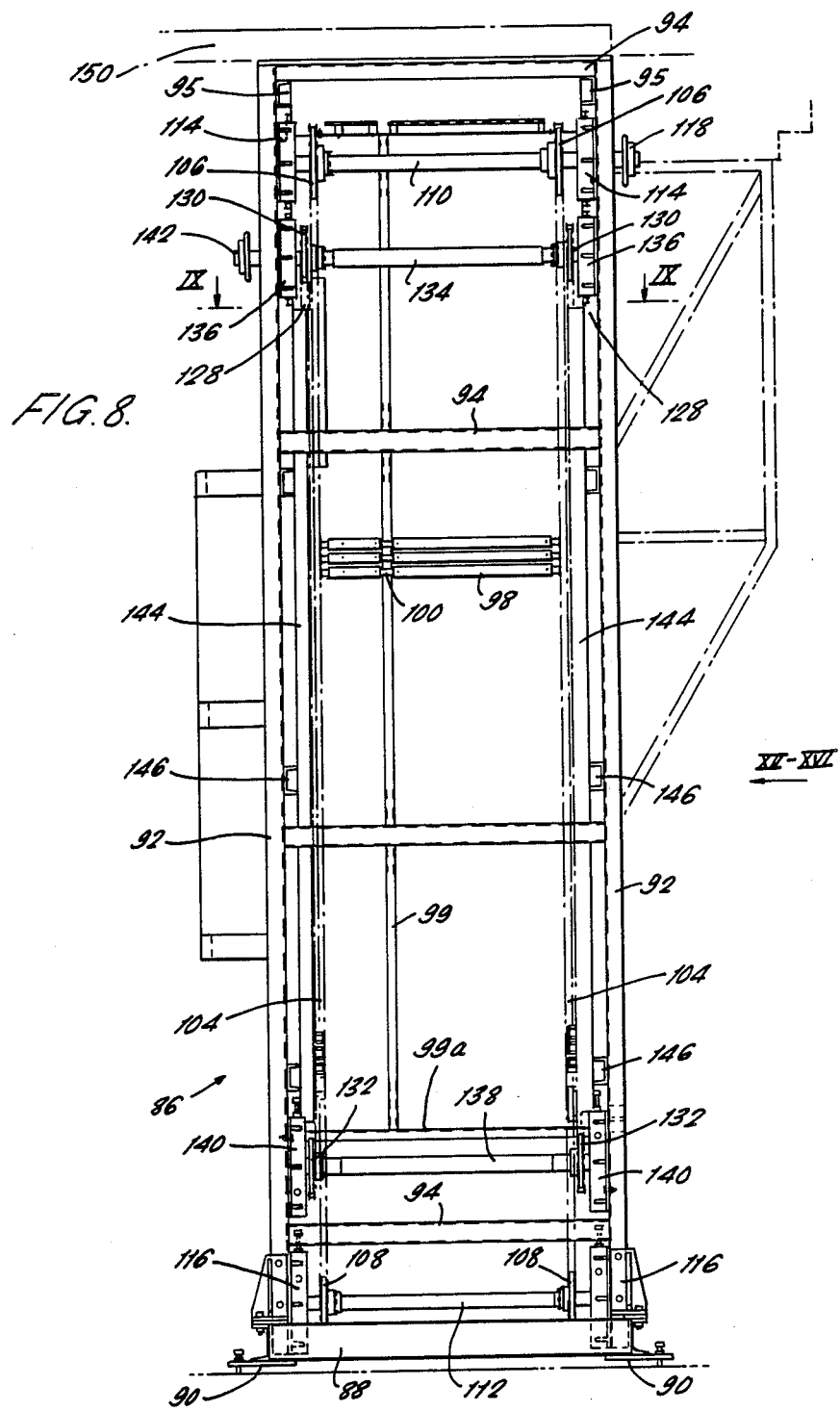
FIG. 8 is a side view in the direction of arrow VIII in FIG. 3 of a first collation assembly of the apparatus.
Figure 9:
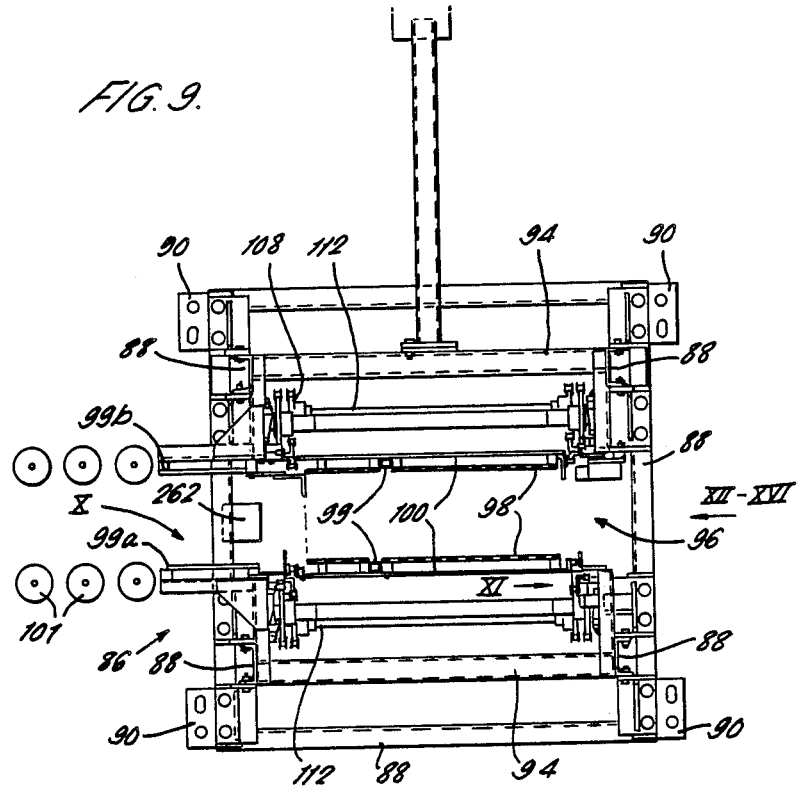
FIG. 9 is a plan section view along the line IX—IX of FIG. 8.

The collation assembly 68, see FIGS. 8 and 9, comprise a floor mounted fabricated mainframe 86 of open box-like configuration.

The mainframe 86 comprises a rectangular base frame 88 provided with adjustment pads 90 at each corner thereof to facilitate the ready adjustment of the trim of the assembly.

The base frame 88 provides support for four pillars 92 joined, at the opposite sides of the assembly, by cross pieces 94 and, at the top of the frame 86, by cross members 95.

The mainframe 86 provides support for a conveyor assembly 96 comprising two sets of shelves 98 which, when the apparatus 50 is in use, are adapted to remove tiles T from the cords 80 of the conveyor 60 as hereinafter described.

The shelves 98 of each set are of inverted "L" shape in cross-section, see FIGS. 11 to 16, and are secured to carrier bars 100 mounted between links 102 of pairs of endless chains 104 on opposite sides of the assembly, see FIG. 9.

The pairs of chains 104 are arranged about associated upper and lower sprockets 106 and 108 respectively, the sprockets 106 being fixedly mounted on a shaft 110 and the sprockets 108 of a shaft 112, see FIGS. 8 and 9.

The shafts 110 and 112 are rotatably mounted in associated bearing blocks 114 and 116 which blocks are secured to the mainframe 86 by conventional means.

Each shaft 110 extends through one of its bearing blocks 114, as shown at the upper right hand side of FIG. 8, to provide support for associated drive sprockets 118 which, when the apparatus is in use, are driven, as hereinafter described, to effect movement of the two sets of shelves 98 of the conveyor assembly 96.

When the apparatus 50 is in use the shelves 98 of each set are constrained to move in mutually aligned pairs through an inner run of the conveyor assembly 96 in one of two operative modes as hereinafter described.

Figure 12:
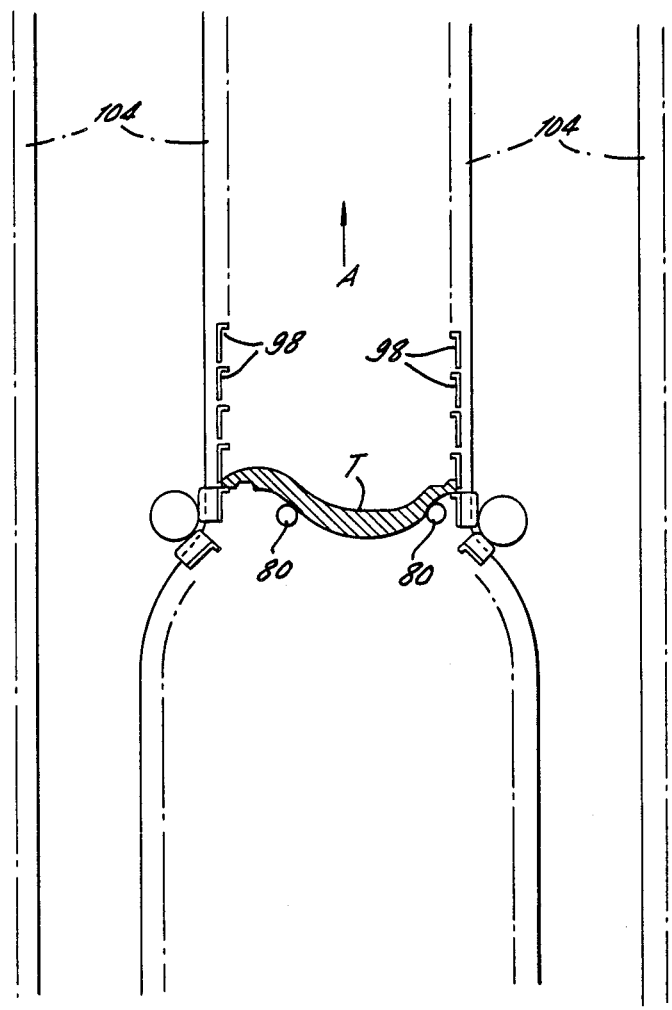
FIGS. 12 to 16 are schematic representations in the direction of the arrows XII-XVI on FIGS. 3, 8 and 9, showing the sequence of operations of the collation assembly.
Figure 16:
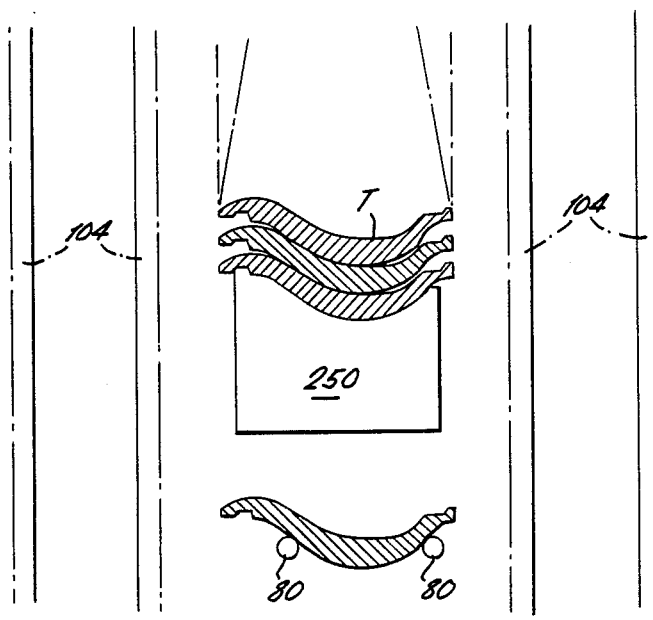

In a first operative mode the mutually aligned pairs of shelves 98 of each set are arranged in a spaced relationship in which they can support a concrete tile T therebetween as shown diagrammatically in FIGS. 12 and 16.

In a second operative mode, however, the mutually aligned pairs of shelves 98 of each set are arranged further apart than in said first operative mode and cannot support concrete roofing tiles T, see FIGS. 12 and 16.

However, space-bars 99 supported on cross bars 99a of the mainframe 86, see FIGS. 8 and 9 are provided and prevent sideways movement of unbanded stacks of tiles when the shelves are in their second operative mode.

Figure 10:
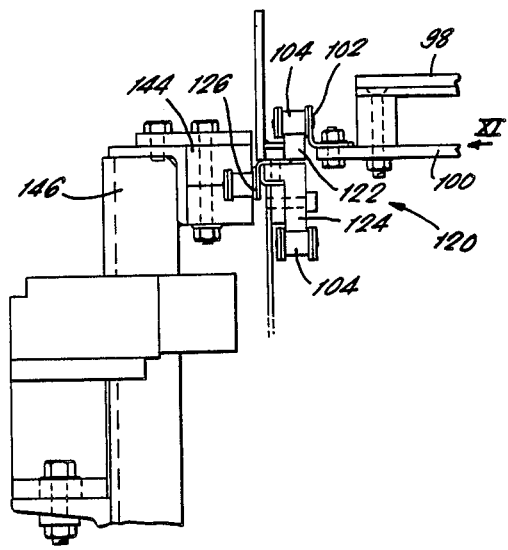
FIG. 10 is an enlarged detail of part of FIG. 9.
Figure 11:
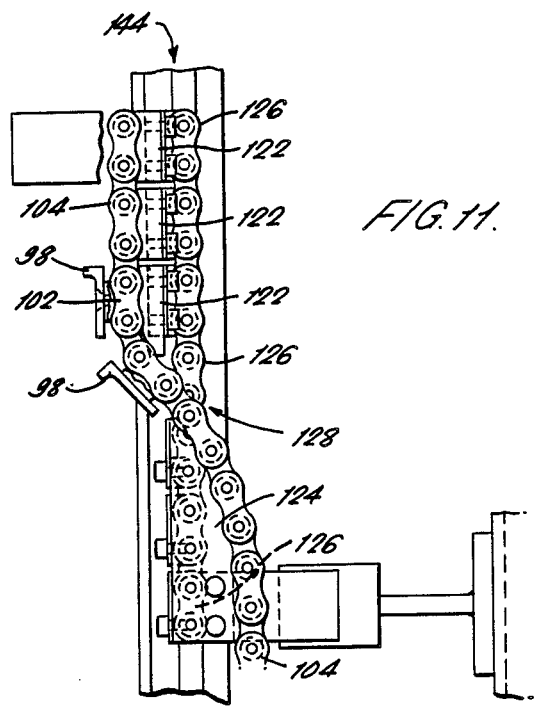
FIG. 11 is a further enlarged detail of a part of a chain and cam assembly as seen in the direction of the arrow XI of FIG. 10, but with certain parts omitted for clarity.

Movement of the shelves 98 between the first and second operative modes is effected by a cam arrangement 120 associated with each set of shelves 98 which cam arrangement 120 is to be described herein with particular reference to FIGS. 9, 10 and 11. FIG. 10 is an enlarged detail of the area indicated by arrow X in FIG. 9.

Each cam arrangement 120 comprises two sets of cams 122 and 124 which sets are mirror images one of the other; thus, only the set shown in FIGS. 10 and 11 will be described in detail.

The cams 122 and 124 are carried by the links 126 of an endless chain 128 which passes about sprockets 130 and 132 at upper and lower ends respectively of the assembly 86, see FIG. 8. The sprocket 130 is fixedly mounted on a rotatable shaft 134 mounted in bearing blocks 136 secured to the mainframe 86 and the sprocket 132 is fixedly mounted on a rotatable shaft 138 mounted in bearing blocks 140 also secured to the mainframe 86.

Each shaft 134 extends through the bearing block 136 provided at the left hand side of the mainframe, see FIG. 8, and provides support for a drive sprocket 142 which, when the apparatus is in use, is driven, as hereinafter described, to effect movement of the cams 122 and 124 of each cam arrangement 120.

When the apparatus 50 is in use the endless chains 128, like the endless chains 104, traverse an inner run of the conveyor assembly 96 to effect movement of the cams 122 and 124. However, the links of the chains 128 are held captive in said run by chain guides 144 fixedly mounted on the pillars 92 by tie bars 146, see FIG. 8; thus, while the chains 128 and their cams 122 and 124 are constrained to move in straight path, the chains 104 are constrained by the cams 122 and 124 to follow the path illustrated in FIG. 11 and to pass between their first and second operative modes. Thus, as shown in FIGS. 10 to 16, when the apparatus is in use, the shelves may or may not be in a condition to support a tile T fed thereto by the conveyor 60.

In addition, the cams 122 are provided on all of the links 126 above the cam arrangement 120 and provide support for the chains 104 against movement away from the centre of the assembly 68. In this way, the integrity of the spaced stack of tiles in the assembly 68 is maintained.

Figure 3:
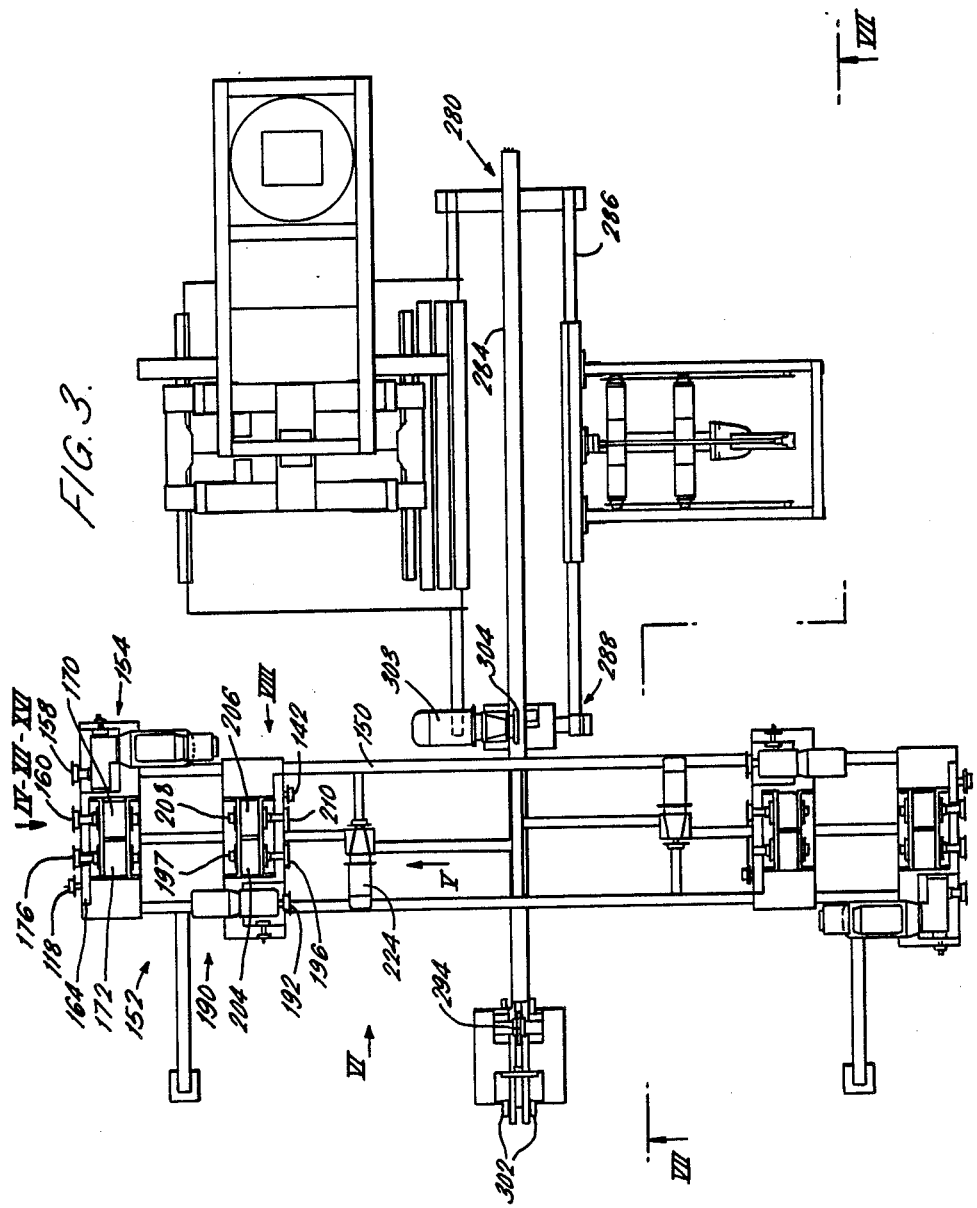
FIG. 3 is a plan view of the collation assembly with parts omitted for clarity.
Figure 6:
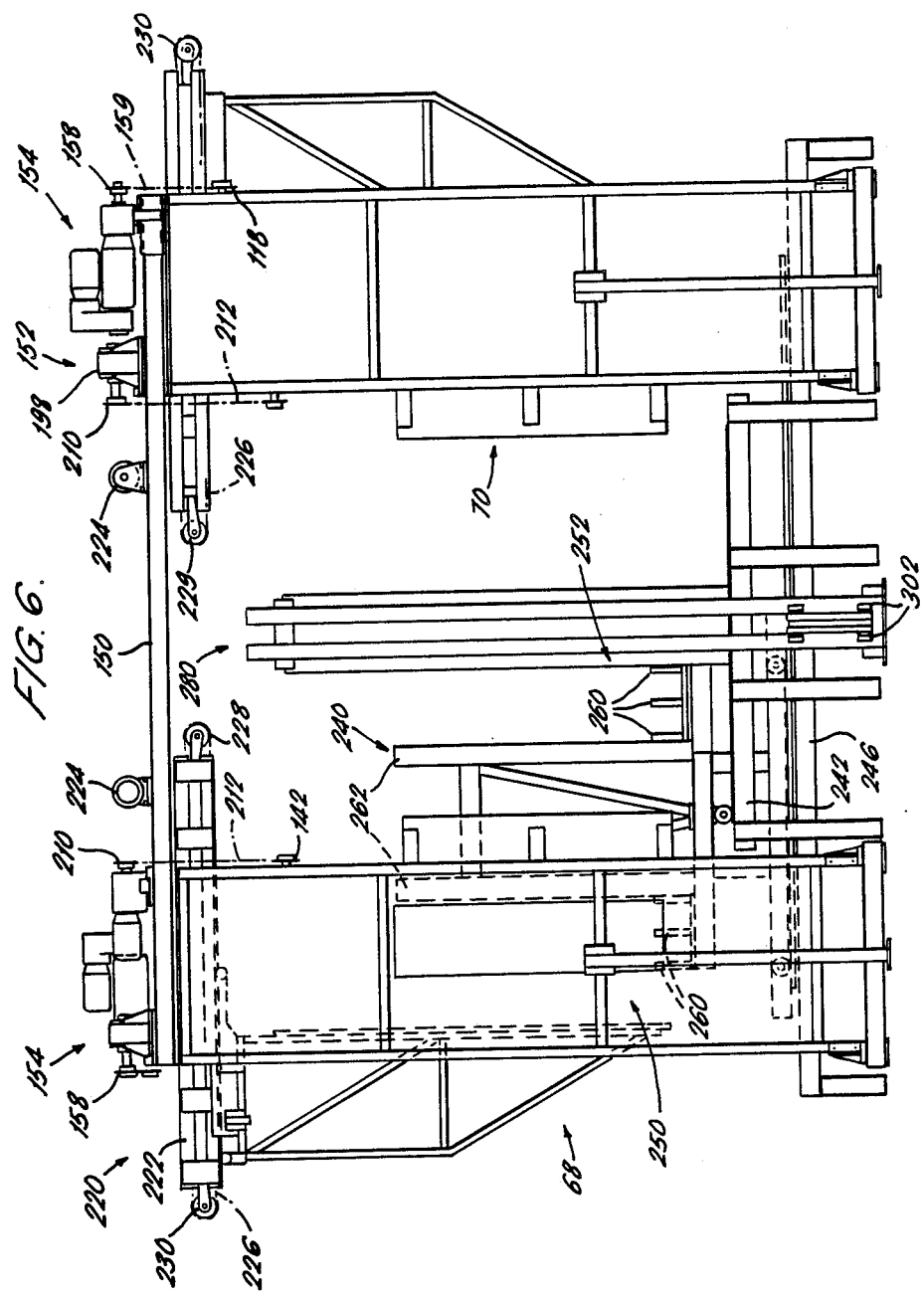
FIG. 6 is a side view of the collation assembly and packaging apparatus as seen in the direction of the arrow VI in FIG. 3.

The mainframes 86 of the collation assemblies 68 to 70 are connected together at their upper ends, see FIGS. 3 and 6 by a head-frame 150, which provides support for substantially identical drive means 152 for the conveyors 96 of each collation assembly 68 and 70.

Figure 4:
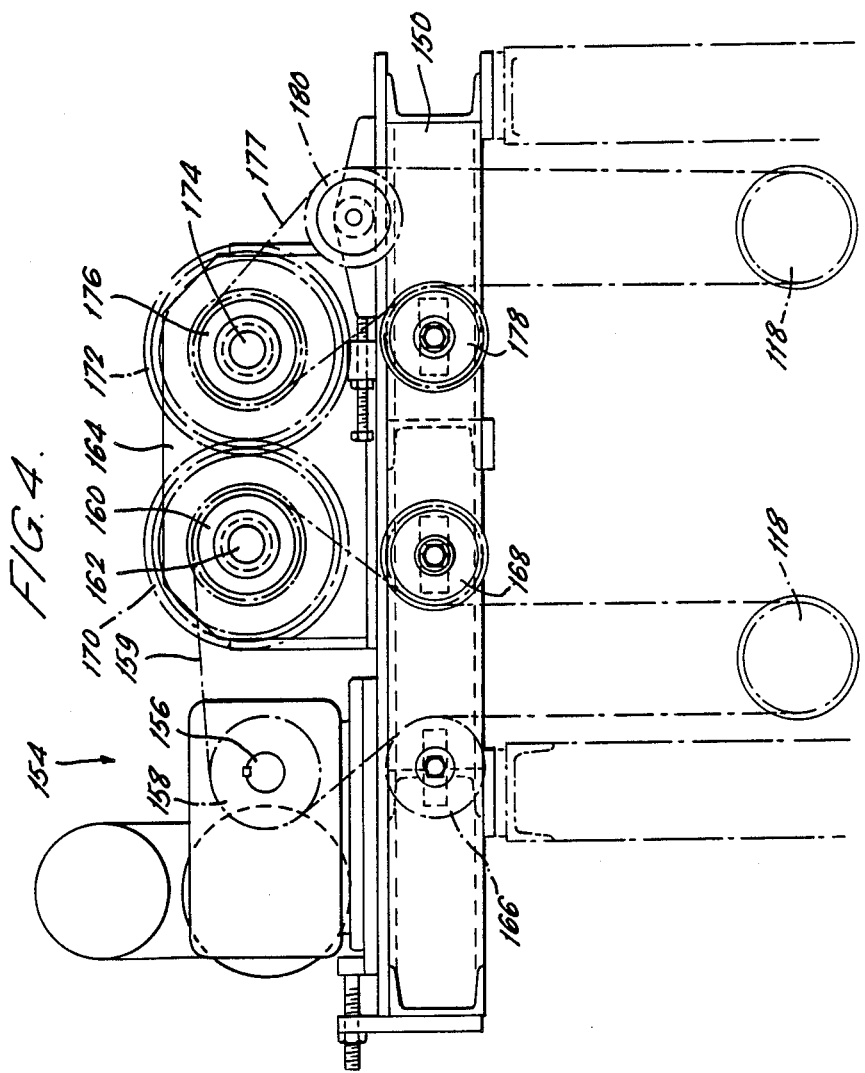
FIG. 4 is an enlarged view of the upper part of the collation assembly looking in the direction of the arrow IV in FIG. 3.
Figure 5:
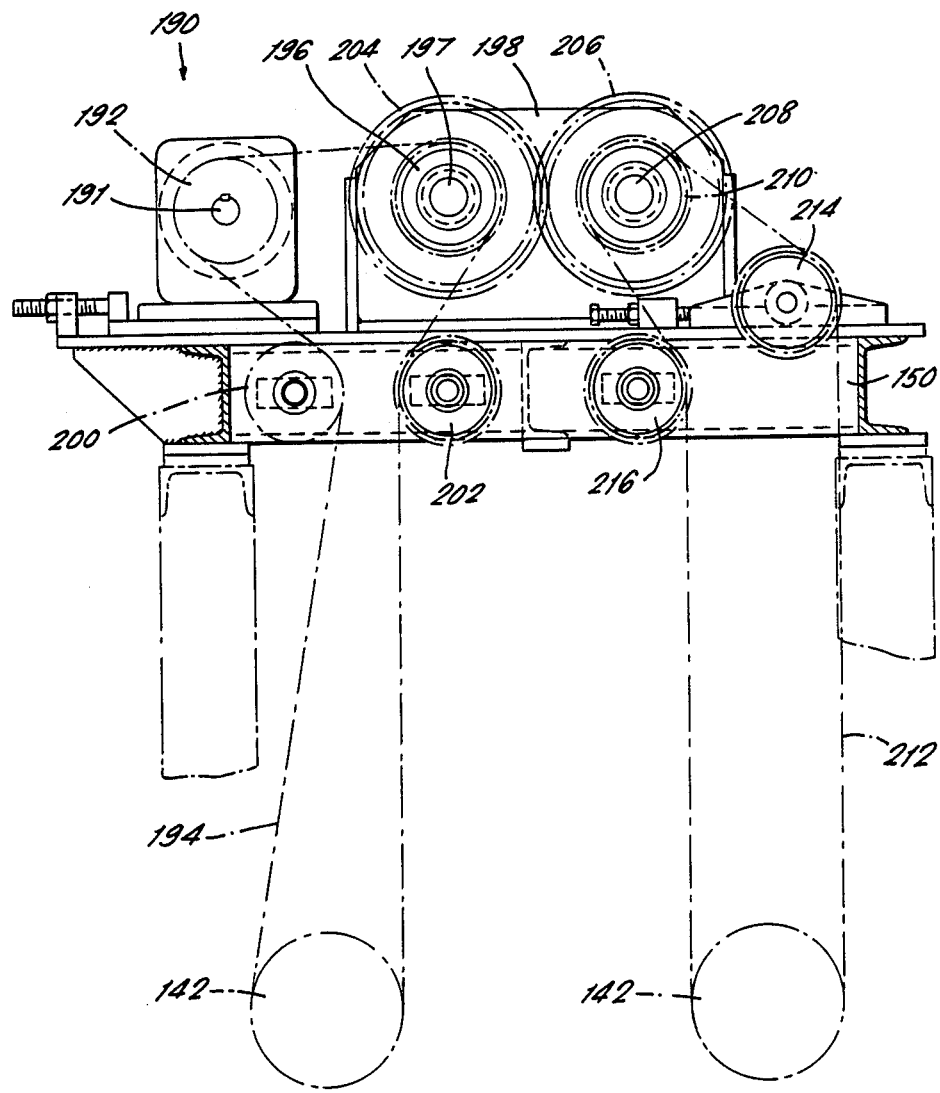
FIG. 5 is a view similar to FIG. 4 but looking in the direction of the arrow V in FIG. 3.

The drive means 152 of the assembly 68, see FIGS. 3, 4 and 5 comprises a motor and gear box 154 the output shaft 156 of which supports a sprocket 158. The sprocket 158 is connected by an endless chain 159 to the sprocket 118 associated with the rearward set of shelves 98 in FIG. 8, i.e. the upper set of shelves 98 in FIG. 9. The endless chain 159 connects the sprocket 158 to a further sprocket 160 of a drive shaft 162 which is in turn rotatably mounted in a bearing block 164 secured to the head frame 150.

Two idler sprockets 166 and 168 are provided on the head frame 150, see FIG. 4, for guiding and tensioning the endless chain 159.

The drive shaft 162, see FIGS. 3 and 4, also provides support for a spur gear 170 which meshes with a spur gear 172 fixedly mounted on a driven shaft 174.

Mounted on an outer end of the shaft 174 is a sprocket 176 which is connected by an endless chain 177 to the sprocket 118 of the forward set of shelves 98 in FIG. 8, i.e. the lower set of shelves 98 in FIG. 9.

Two idler sprockets 178 and 180 are provided on the head frame 150, see FIG. 4, for guiding and tensioning the endless chain 177. Thus, it will be appreciated that operation of the motor and gear box 154 will cause movement of each set of shelves 98 in unison one with the other when the apparatus 50 is in use to form successive stacks of tiles T as hereinafter described.

The drive means 152, see FIGS. 3, 4, 5 and 6 also comprise a motor and gear box 190 the output shaft 191 of which supports a sprocket 192.

The sprocket 192 is connected by an endless chain 194 to the sprocket 142 associated with the rearward set of cams 122 and 124 in FIG. 8, i.e. the lower set of cams 122 and 124 in FIG. 9. The endless chain 194 connects the sprocket 192 to a further sprocket 196 of a drive shaft 197 which is in turn rotatably mounted in a bearing block 198 secured to the head frome 150.

Two idler sprockets 200 and 202 are provided on the head frame, see FIG. 5, for guiding and tensioning the endless chain 194.

The drive shaft 197, see FIGS. 3 and 5, also provides support for a spur gear 204 which meshes with a spur gear 206 fixedly mounted on a driven shaft 208 secured in said bearing block 198 adjacent and parallel to the shaft 196.

Mounted on outer ends of the shaft 208 is a sprocket 210 which is connected by an endless chain 212 to the sprocket 142 of the forward set of cams 122 and 124 of FIG. 8 i.e. the lower set in FIG. 9.

Idler sprockets 214 and 216 are provided in the head frame 150, see FIG. 5, for guiding and tensioning the endless chain 212.

Thus, it will be appreciated that operation of the motor and gear box 190 will cause movement of the two sets of cams 122 and 124 associated with each set of shelves 98 whereby, when the apparatus 50 is in use, the shelves 98 are moved between their operative modes to effect the collation of a stack of tiles T as hereinafter described with particular reference to FIGS. 12 to 16.

The collation assembly 68 also comprises a pusher arm 220, see FIG. 6, which arm is supported for movement on a bracket assembly 222 secured to the head frame 150. Drive to the pusher arm 220 is effected by a brake motor 224 mounted on said frame 150 and connected to the arm 220 by a chain 226 which passes around guide sprockets 228 and 230 at left and right hand ends of the bracket assembly 222 respectively and two guide sprockets (not shown) which are mounted on the bracket assembly beneath the motor 224. Appropriate sensors and limit switches are provided for determining the movement of the arm 220.

The Stack Positioning Means

Figure 7:
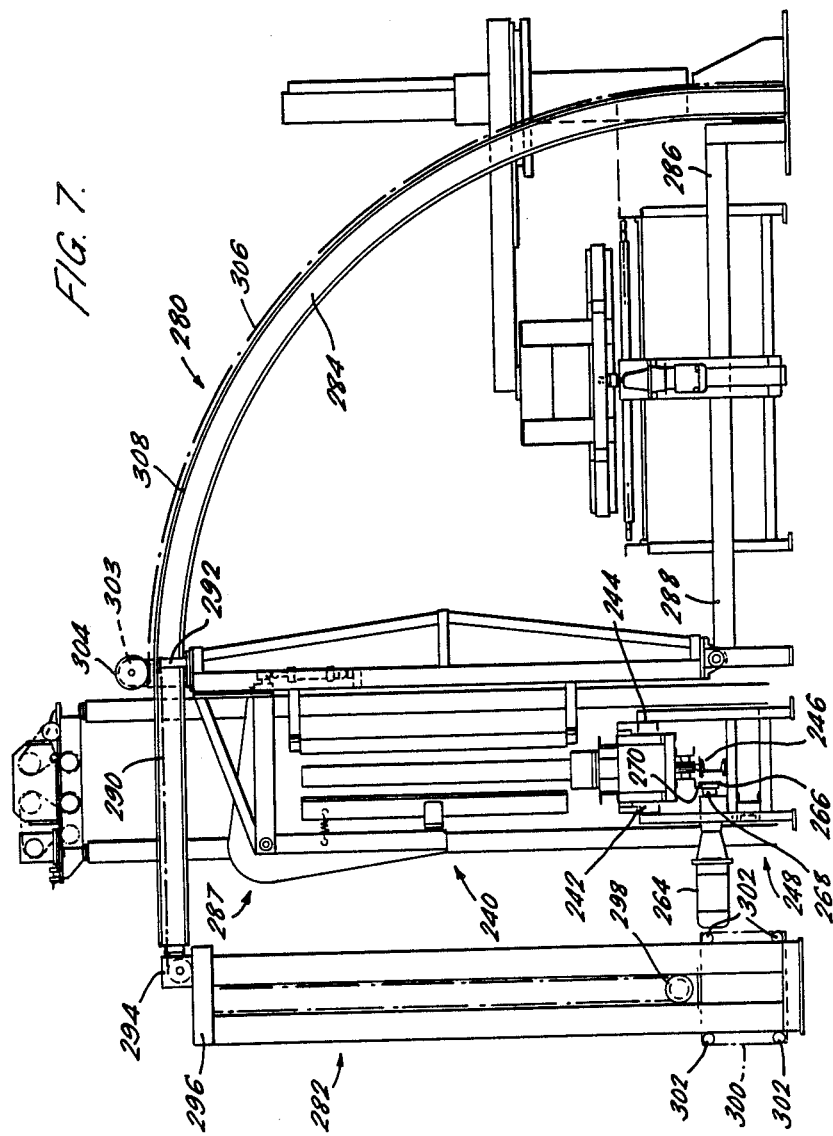
FIG. 7 is a section view of the collation assembly and packaging apparatus taken along the line VII—VII in FIG. 3.

The stack positioning means 72, see FIGS. 2, 6 and 7 comprise a wheeled carriage 240 arranged on upper rails 242, 244 and a lower rail 246 for movement between the collation assemblies 68 and 70.

The carriage 240 is made from fabricated sections, see especially FIGS. 6 and 7 and the rails 242, 244 and 246 are provided on a floor mounted fabricated sub-frame 248 which extends between the collation assemblies 68 and 70.

The carriage 240 comprises stack support means 250 and 252, the means 250 being for the stacks of tiles T formed at the collation assembly 68 and the means 252 being for stacks of tiles T formed at the collation assembly 70.

Each means 250 and 252 comprises a series of adjustable fingers 260, for supporting the lowermost tile in a stack, the means 250 and 252 also comprising a vertical support column 262 against which the tiles on the fingers 260 are stacked, see FIG. 6.

Movement of the carriage 240 between the assemblies 68 and 70 is effected by a motor 264, FIG. 7, secured to the sub-frame 248 and having a chain wheel 266 provided on its drive shaft 268. The chain wheel 266 is arranged in engagement with a chain 270 provided along the underside of the carriage 240, see FIG. 7.

Thus, when the apparatus 50 is in use, the carriage may be moved as aforesaid to transfer stacks of tiles T from the assemblies 68 and 70 to the banding means 74 and 76 respectively and thence to the orienting device 78.

The banding means 74 and 76, which are provided midway between the assemblies 68, 70 and the orienting device 78, are of conventional design and details thereof will not be included herein.

The Orienting Device

The orienting device 78 is merely a transfer arrangement for positioning banded stacks as aforesaid and, because it forms only an ancillary part of the invention disclosed herein, it will only be described hereinafter in outline detail with reference to FIGS. 2, 6 and 7.

The device 78, comprises a fabricated floor mounted mainframe 280 comprising a vertical column 282 at a left hand side thereof, see FIG. 7, and an arcuate trackway 284 extending from the top of said column 282, and beneath the head frame 150 to a floor mounted subframe 286.

An adjustable "C" clamp 287 of conventional configuration is pivotally mounted and supported on a left hand end 288 of the sub-frame 286, see FIG. 7, and is guided on said arcuate trackway 284 by a chain 290 attached to an element 292 provided on the "C" clamp adjacent the trackway 284. The chain 290 extends to the left in viewing FIG. 7 and engages around a sprocket 294 at the top of said column 282 and is connected to an adjacent portion 296 of said column 282 after passing downwardly and around a sprocket 298 rotatably mounted on a balance weight 300 supported by the column 282.

The balance weight 300 is provided with rolls 302 which engage outside walls of the column 282, the arrangement being such that, as the "C" clamp is pivoted clockwise, viewing FIG. 7, the balance weight 300 will be raised by the chain 290 to keep the system in equilibrium.

The drive means for moving the "C" clamp as aforesaid comprises a brake motor 303 carried by an outer portion of the "C" clamp which motor 303 is provided with a wheel 304 arranged to engage a chain 306 provided on an upwardly facing surface 308 of the arcuate trackway 284, see FIG. 7; thus, it will be apparent that energisation of the motor 303 will cause movement of the "C" clamp about the arcuate trackway 284.

Operation of the Collation and Packaging Apparatus

When the tile plant is in use cured tiles T, stripped from their pallets P, are fed by the infeed conveyor 62 via the transfer conveyor, not shown, to the stripper conveyor 60.

As they pass along the stripper conveyor 60, the tiles T are supported on the cord 80 thereof as shown in FIGS. 12 to 16.

With the motor 154 energised to rotate the shaft 156 in an anti-clockwise direction, viewing FIG. 4, the shelves 98 are caused to move up the inner run of the assembly 96 i.e. in the direction of the arrow A in FIG. 12. Thus, as the tiles T are carried through the assembly 68, they are lifted from the cords 80 one at a time by the shelves 98 as shown in FIG. 12. At this time, the motor 190 is de-energised and the cams 122 and 124 are stationary and in a position in which the chain 104 and shelves 98 are adjacent the cords 80.

In order to ensure that the tiles T arrive at a lifting locality of the assembly 68 in a spaced relationship, the conveyor 60 is operated at a greater speed than that of the infeed conveyor 62.

Thus, when a first tile reaches the lifting locality appropriate sensors, not shown, generate a signal to cause energisation of the motor 154 to raise the shelves 98 as aforesaid.

As soon as the tile so lifted is clear of the pathway of a next line tile the motor 154 is deenergised and braked to stop thereby facilitating the entry of the next in line tile into the lifting locality and overlying the next pair of shelves 98.

Arrival of the next in line tile is sensed by the sensors and the sequence is repeated.

Figure 13:
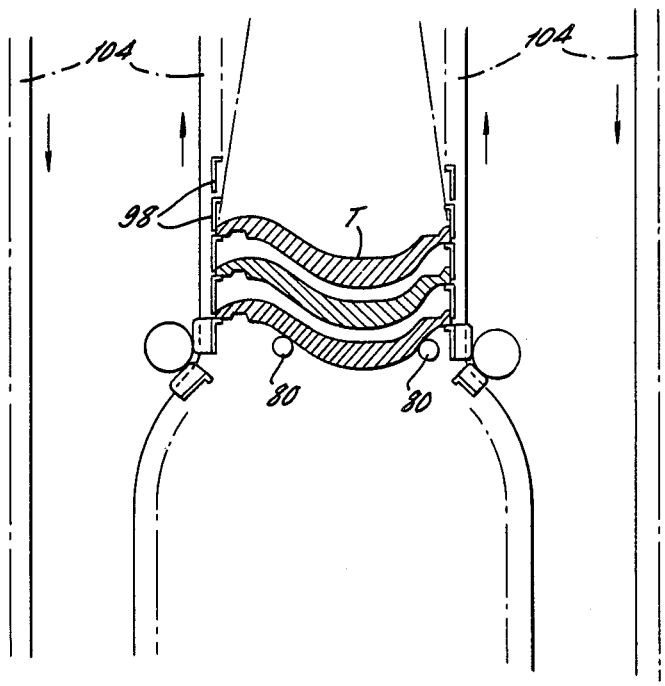

Tiles T are lifted from the conveyor 60 in this way until some fifty or so tiles are stacked in spaced relationship as shown diagrammatically in FIG. 13.

Figure 14:
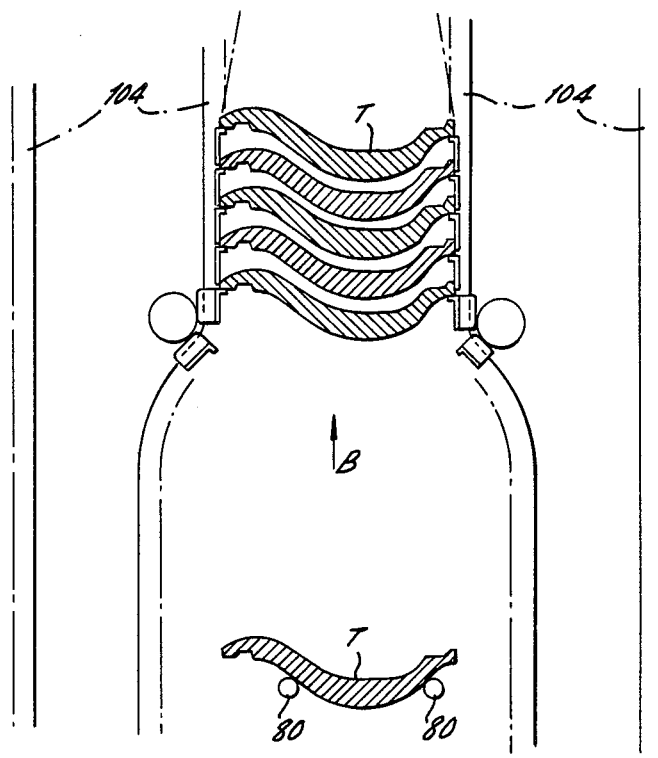

When the last of the required number of tiles T is located in said spaced relationship the motor 154 continues to run raising the shelves 98; in addition the motor 190 is energised to rotate the shaft 191 in an anticlockwise direction, see FIG. 5, thereby causing upward movement of the cams 122 and 124 in the direction of the arrow B in FIG. 14, the cams moving at the same speed as the shelves 98 thereby maintaining the shelves 98 supporting the tiles T in their first operative mode. Both motors 154 and 190 are stopped when the stack of spaced tiles reaches a predetermined height to allow adjustable fingers 260 of the stack support means 250 to be moved into position below the spaced stack. At this time the motor 224 is energised to cause movement of the pusher arm 222 to the right, see FIG. 6. The arm, thus, contacts trailing end portions of the tiles T forming the spaced stack of such tiles. Continued movement of the arm 222 brings leading end portions of the tiles T into engagement with the column 262 of the means 250.

Figure 15:
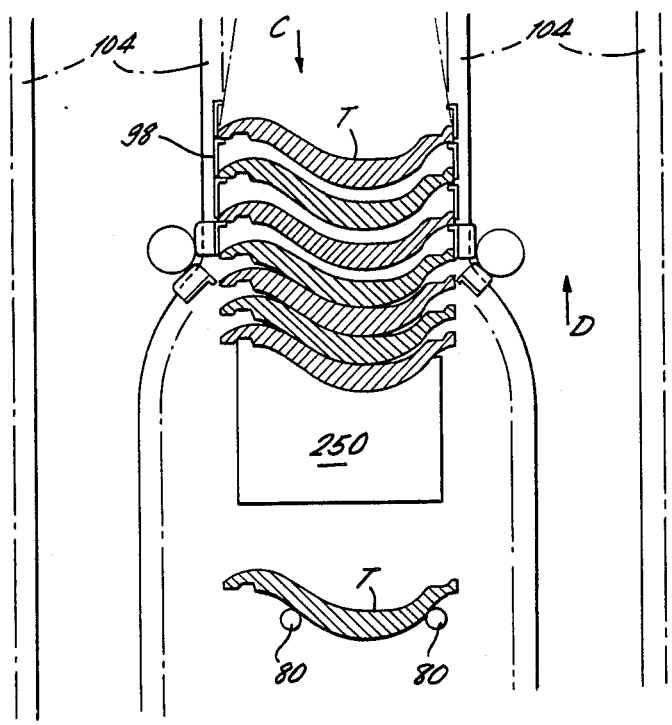

The motor 154 of the assembly 68 is then reversed at slow speed to cause downward movement of the shelves 98 in the direction of arrow C in FIG. 15 whilst the motor 190 continues to run such that the cams 122 and 124 rise in the direction of arrow D in FIG. 15 to cause the correct relative movement between the shelves 98 and the cams 122 and 124 whereby the shelves are moved from their first operative mode to their second operative mode to deposit the tiles T on the fingers 260 of the carriage 240 to form a closed stack of tiles thereon, see FIG. 15.

This sequence continues until the spaced stack of tiles T is deposited as aforesaid and the closed stack is complete, see FIG. 16. At this time, the motors 154 and 190 are deenergised. It will be appreciated that the tiles T in the stack are no longer supported by the shelves 98. However, as mentioned above, the support bars 99 restrain sideways movement of the stack and the pusher arm 220 and column 262 restrain fore and aft movement to the stack of tiles. Thus, the stack has a restraint on all four sides and cannot topple or become misaligned.

The carriage 240 is then moved to the right in FIG. 6 by its motor 264 to bring the stack of tiles supported thereby to the banding means 74 whereat the stack is banded in conventional manner.

During such movement of the carriage 240, the motor 224 is again energised whereby the pusher arm 220 also continues its movement to the right viewing FIG. 6 thereby maintaining the integrity of the stack of tiles T by preventing rearward movement of the stack relative to the column 262. As the carriage moves further to the right, see FIG. 6, the stack of tiles moves out of contact with the support bars 99; however, side plates 99a, secured by brackets 99b to the tie bars 146 on either side of the assembly 68, are effective to maintain the integrity of the stack and to prevent sideways movement thereof as the stack of tiles leaves the collator assembly and passes between two columns of rubber covered side rolls, 101 (FIG. 9), to the banding means 74. Such side rolls straddle the banding means 74 to assist in supporting the stack until it is banded.

At this time, the motor 190 is energised to reposition the cams 122 and 124 and thus the shelves 98 into their respective conditions as shown schematically in FIG. 12. In addition, the motor 154 is energised to reposition the shelves 98 such that one pair lies just below the level of a tile conveyed to the lifting locality by the conveyor 62 and the motor 224 is energised to move the pushed arm 220 to the left viewing FIG. 6 into the position shown therein. The carriage 240 is then centralised with respect to the orienting device 78 and the "C" clamp is operated to remove the banded stack from the positioning means 72. To this end the motor 303 is energised and the "C" clamp is moved clockwise about its pivot, see FIG. 7, to deposit the banded stack on the outfeed conveyor 79.

As these operational sequences are being effected the next spaced stack of tiles T is being completed in the assembly 70 and the carriage 240 is then moved to the right, viewing FIG. 6, by the motor 264 to receive the next stack of tiles therefrom.

It will be appreciated that the above described sequence of operations and necessary switching on and off of the motors, is controlled by appropriate limit switches and sensors. The necessary control circuit and monitoring may be provided by micro-processors.

The invention is not limited to the embodiment described above and various modifications may be made. For example, the apparatus may be arranged so that tiles are fed to the upper end of the collation assemblies 68, the sets of shelves 98 then moving downwards as they are loaded. Further, the relative movements of the shelves 98, support means 250 and cams 120 may be varied to operate in one of several modes as follows:
 (i) The shelves are moved to bring the tiles successively into contact one with the other on the support means 250, the support means remaining stationary and the cam arrangement 120 also moving to space the shelves apart at the critical time to effect the soft stacking of the tiles; or,
 (ii) the shelves are moved but the cam arrangement remains stationary and the support means 250 is moved to compensate for keeping the cam arranement stationary; or
 (iii) the shelves are maintained stationary and the cam and support means are moved relative thereto.

Still further, the orienting device 78 may be replaced by a centilevered arm or other suitable device.

I claim:

1. Apparatus for collating and stacking manufactured building components, comprising:
 a plurality of pairs of opposed shelf means, each shelf means being movable up and down and each shelf means of the opposed pairs of shelf means movable towards and away from each other;
 conveyor means for feeding components to the shelf means;
 means for moving the shelf means up or down in timed relation to the movement of the conveyor thereby to locate the components on the shelf means, opposed edges of each component being supported by a pair of shelf means;
 a support for a stack of components, the support being vertically movable relatively to the shelf means;
 shelf positioning means for moving opposed pairs of shelf means apart, said shelf-positioning means being movable up and down with respect to said shelf means, for moving pairs of shelf means apart in timed relation to relative downward or upward movement between the shelf means and the shelf-positioning means thereby to release the components and stack them on the support; and means for effecting relative movement between the shelf-positioning means and the shelf means, said shelf means, shelf-positioning means and support being relatively movable vertically in a timed relationship which effects the stacking of the components without undue shocks to the components.

2. Apparatus as claimed in claim 1 in which the shelf means move upwardly to locate the components on the shelf means and downwardly to release the components.

3. Apparatus as claimed in claim 1 in which fixed means are provided adjacent to the shelf means, the fixed means serving to restrict sideways movement of the components after the shelf means have moved apart.

4. Apparatus as claimed in claim 1 further comprising pusher means movable in a direction parallel to the shelf means and between pairs of shelf means to push the components into alignment.

5. Apparatus as claimed in claim 4 further comprising a fixed abutment aligned with the pusher means and located adjacent to ends of the shelf means remote from the pusher means, the abutment and pusher means together serving to restrict longitudinal movement of the components.

6. Apparatus as claimed in claim 1 in which one shelf means of each pair is carried by a first chain means and the second shelf means of each pair is carried by a second chain means, said shelves being parallel and spaced apart on their respective chain means and said first and second chain means being simultaneously drivable to move the shelf means up and down.

7. Apparatus as claimed in claim 6 in which the shelf-positioning means are cam means, provided for engaging said first and second chain means to effect relative movement of each pair of opposed shelf means towards and away from each other.

8. Apparatus as claimed in claim 7 in which said cam means are carried by respective third and fourth chain means, said third and fourth chain means being driven simultaneously and in timed relation to said first and second chain means.

9. Apparatus as claimed in claim 1 in which said component stack support is located on a carriage, said carriage being movable between a first position in which the support is aligned with the shelf means for receiving a stack of components and a second position in which clamping means is engageable with the stack of components to remove the stack from the support.

10. Apparatus as claimed in claim 1 in which two pluralities of pairs of shelf means are provided, one forming a first stacking device and the other forming a second stacking device.

11. Apparatus as claimed in claim 10 having first and second stacking devices arranged at spaced locations along said conveyor means.

12. Apparatus as claimed in claim 11 in which said carriage has two component stack supports mounted thereon, the arrangement being such when one of the said supports is in a first position relative to said first stacking device, another support is in a second position relative to the second stacking device, and vice versa.

13. Apparatus as claimed in claim 9 in which said clamping means is slideable along an arcuate support for movement between a first position in which the clamping means engages and clamps a vertical stack of components and a second position in which said stack is generally horizontal.

14. Apparatus as claimed in claim 1 in which the building components are concrete roof tiles.

15. Apparatus as claimed in claim 1 further comprising means for securing bands around the stack of components.

16. Apparatus as claimed in claim 1, wherein the support remains stationary and the soft stacking of the components is effected by relative movement between the shelf means and the shelf-positioning means.

17. Apparatus for collating and stacking manufactured building components, comprising:

first and second chain means simultaneously drivable up or down;

a plurality of pairs of shelf means carried by the chain means such that the shelf means are movable up or down, one shelf means of each pair being carried by the first chain means and a second shelf means of each pair being carried by the second chain means, said shelf means being parallel and spaced apart on their respective chain means;

cam means for engaging said first and second chain means to effect movement of each shelf means of the pairs of shelf means towards and away from each other;

conveyor means for feeding the components to the shelf means, and a support for a stack of components, said first and second chain means being simultaneously driven so as to move the pair of shelf means up or down in timed relation to the conveyor means, thereby to locate the components on the shelf means, opposed edges of each component being supported by a pair of shelf means, means for moving pairs of shelf means apart in timed relation to downward or upward movement of the shelf means thereby to release the components and stack them on the support, the relative timing of the movements being such that the stacking of the components is effected without undue impact shocks to the components.

18. Apparatus as claimed in claim 17 in which said cam means are carried by respective third and fourth chain means, said third and fourth chain means being driven simultaneously and in timed relation to said first and second chain means.

* * * * *